(No Model.)

S. G. McFARLAND.
WATER CLOSET.

No. 355,831. Patented Jan. 11, 1887.

Witnesses:
J. Stail
Chr. H. Smith

Inventor
Samuel G. McFarland
per Lemuel W. Serrell
atty

N. PETERS, Photo-Lithographer, Washington, D. C.

United States Patent Office.

SAMUEL G. McFARLAND, OF NEW YORK, N. Y.

WATER-CLOSET.

SPECIFICATION forming part of Letters Patent No. 355,831, dated January 11, 1887.

Application filed January 25, 1886. Serial No. 189,582. (No model.)

*To all whom it may concern:*

Be it known that I, SAMUEL G. McFARLAND, of the city and State of New York, have invented an Improvement in Water-Closets, of which the following is a specification.

This improvement relates to that class of closets in which the bowl has a concave bottom and a lateral or front discharge, and in which the rush of water carries the soil and water out of the concave bottom into the lateral discharge and the trap beneath the same. The sides of the bowl are washed and the discharge promoted by the jets of water converging toward the discharge-opening, and I make use of a deflector beneath the bowl of the closet and over the discharge or sewer pipe, in combination with a ventilating-pipe behind the deflector, so that such ventilating-pipe is protected from the contents of the closet splashing into the same.

Figure 1:
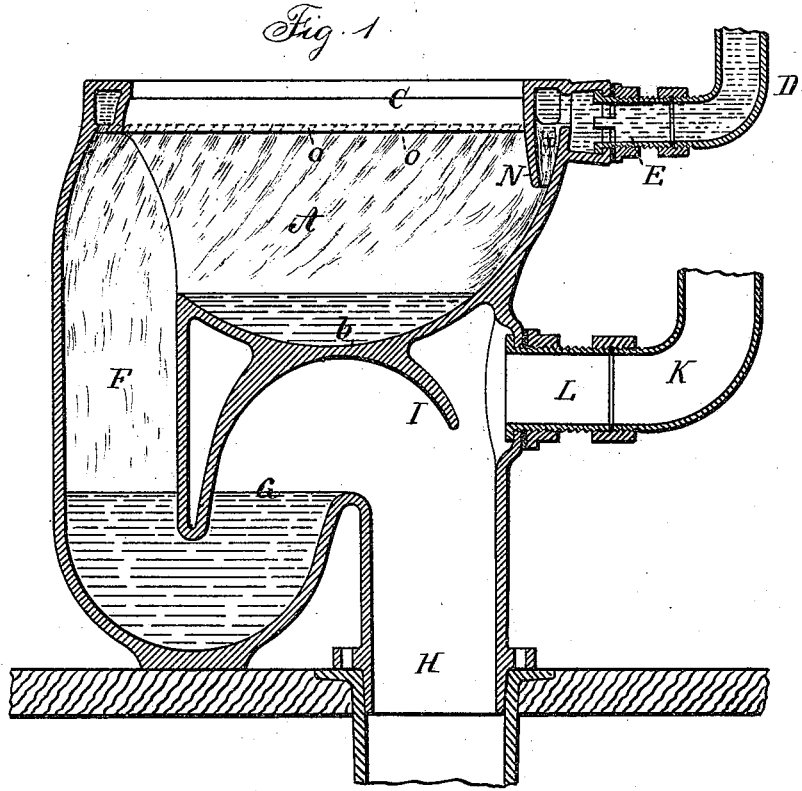
Figure 2:
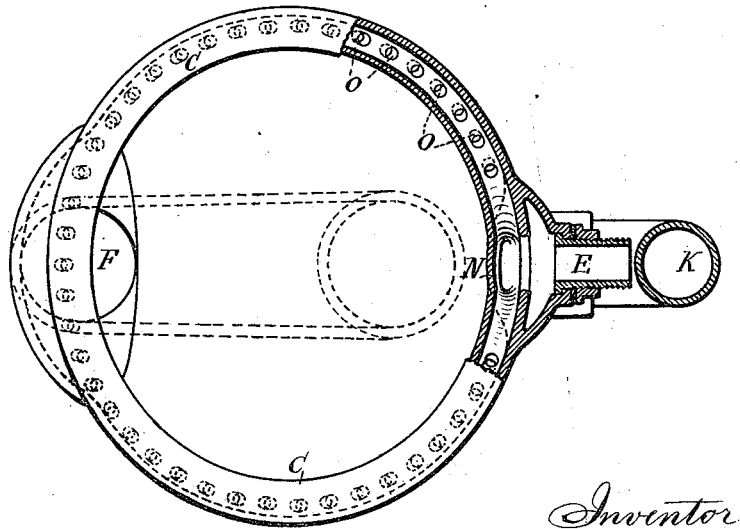

In the drawings, Figure 1 is a vertical section, and Fig. 2 is a plan view with part of the flushing rim and water-supply pipe in section.

The water-closet bowl, flushing-rim, trap, and sewer-pipe are preferably made in one piece, of porcelain or earthenware. The bowl portion A has a concave bottom, *b*, and a flushing-rim, C, to which the water-supply pipe D is connected by any suitable ferrule or coupling, E.

At F is the lateral discharge, at one side of the bowl, leading to the trap G, which trap curves backwardly and upwardly beneath the basin, and then downwardly to the discharge or sewer pipe H, these parts being of ordinary construction, except as next set forth.

The deflector I is above the sewer-pipe H, and it forms a shield to the entrance of the ventilating-pipe K, such pipe being attached to the porcelain of the closet and an opening in the side by a ferrule or other coupling, L, so that the materials discharging through the trap G cannot splash into the ventilating-pipe K in consequence of the action of this deflector I.

The water-supply pipe and coupling D E are at the opposite side of the bowl A to the discharge F, and the deflector N, having a slotted opening at the bottom, is below the flushing-rim and directly adjacent to the water-pipe D, so that the principal portion of the water passing through said pipe D is directed downward and acts powerfully to drive the water and soil out of the concave bottom of the water-closet into the discharge-pipe F, and the holes O, that pass through the under edge of the flushing-rim, are inclined toward the discharge-pipe F, so that the water passing down through these inclined holes O washes the sides of the bowl A and the surface of the discharge-pipe F, so as to cleanse the same, and the direction of the jets is to promote the rapid delivery of the contents of the closet, as such jets converge to the upper part of the discharge F, thereby effectually cleansing the closet.

I do not claim a deflector between the sewer-pipe and the ventilator-pipe, as this has been used with a partition extending downwardly; but the same is liable to receive moisture and trap the ventilating-pipe, and in cases where the ventilating-pipe has been without a deflector the escaping materials are liable to splash into the same and not to be washed out.

I claim as my invention—

A water-closet bowl having a concave bottom and a discharge-pipe, F, at one side, in combination with the trap G, sewer-pipe H, ventilating-pipe passing off laterally from the top of the sewer-pipe, and the pendent and downwardly-curved deflector I, above the sewer-pipe H, and in front of and partially covering the adjacent opening into the ventilating-pipe, to prevent the escaping materials splashing into the ventilating-pipe, substantially as set forth.

Signed by me this 21st day of January, A. D. 1886.

SAMUEL G. McFARLAND.

Witnesses:
GEO. T. PINCKNEY,
WILLIAM G. MOTT.